(12) United States Patent
Tran et al.

(10) Patent No.: US 8,318,233 B2
(45) Date of Patent: Nov. 27, 2012

(54) EMULSIONS USEFUL IN BEVERAGES

(75) Inventors: Irene Tran, East Brunswick, NJ (US); Jason Z. Li, Bridgewater, NJ (US)

(73) Assignee: Corn Products Development Inc, Westchester, IL (US)

( * ) Notice: Subject to any disclaimer, the term of this patent is extended or adjusted under 35 U.S.C. 154(b) by 328 days.

(21) Appl. No.: 12/748,013

(22) Filed: Mar. 26, 2010

(65) Prior Publication Data

US 2011/0236558 A1    Sep. 29, 2011

(51) Int. Cl.
     *A23D 7/00*      (2006.01)
(52) U.S. Cl. ........................ 426/602; 426/590
(58) Field of Classification Search .............. 426/602, 426/590
See application file for complete search history.

(56) References Cited

U.S. PATENT DOCUMENTS

| | | | | |
|---|---|---|---|---|
| 4,284,655 A * | 8/1981 | Miller et al. | ........... | 426/602 |
| RE31,754 E * | 12/1984 | Miller et al. | ........... | 426/602 |
| 4,705,691 A * | 11/1987 | Kupper et al. | ........... | 426/590 |
| 5,616,358 A * | 4/1997 | Taylor et al. | ........... | 426/590 |
| 6,214,349 B1 | 4/2001 | Segelman | | |
| 7,732,001 B2 * | 6/2010 | Smorholm | ........... | 426/602 |
| 8,153,180 B2 * | 4/2012 | Grenville et al. | ........... | 426/602 |
| 2002/0076476 A1 * | 6/2002 | Kuil et al. | ........... | 426/605 |
| 2006/0105093 A1 * | 5/2006 | Bialek et al. | ........... | 426/604 |
| 2007/0071876 A1 * | 3/2007 | Smorholm | ........... | 426/602 |
| 2008/0058418 A1 | 3/2008 | D'Angelo et al. | | |
| 2008/0148626 A1 | 6/2008 | Brunelle et al. | | |
| 2008/0260919 A1 * | 10/2008 | Klingenberg | ........... | 426/250 |
| 2009/0258133 A1 * | 10/2009 | Bodor et al. | ........... | 426/602 |
| 2009/0317509 A1 * | 12/2009 | Golding et al. | ........... | 426/2 |
| 2009/0317532 A1 | 12/2009 | Bromley | | |
| 2010/0298435 A1 * | 11/2010 | Abril et al. | ........... | 514/560 |
| 2010/0305218 A1 * | 12/2010 | Wooster et al. | ........... | 514/784 |

FOREIGN PATENT DOCUMENTS

| | | | |
|---|---|---|---|
| JP | 60190224 A | 9/1985 |
| JP | 62011541 A | 1/1987 |
| JP | 63098369 A | 4/1988 |
| JP | 63157934 A | 6/1988 |
| JP | 2238869 A | 9/1990 |
| JP | 2258044 A | 10/1990 |
| JP | 5038275 A | 2/1993 |
| JP | 6022697 A | 2/1994 |
| JP | 08051928 A | 2/1996 |
| JP | 2004091392 A | 3/2004 |
| JP | 2005160435 A | 6/2005 |
| WO | 97/03576 A1 | 6/1997 |
| WO | 2007/060171 A1 | 5/2007 |
| WO | 2008/140065 A2 | 11/2008 |
| WO | 2009/020280 A1 | 2/2009 |
| WO | WO 2009/090249 | * 7/2009 |

OTHER PUBLICATIONS

Arditty, et al., Interfacial properties in solid-stabilized emulsions, Eur. Phys. J., (2005), 381-393, B44.

* cited by examiner

*Primary Examiner* — Carolyn Paden
(74) *Attorney, Agent, or Firm* — Thomas C. McKenzie; Karen Kaiser

(57) ABSTRACT

It has now been found that emulsions having a discrete phase volume fraction of 60% to 67% with excellent stability may be prepared using at least one low molecular weight surfactant. Such emulsions have high oil loading and a small mean particle size of less than 0.2 microns. Further, such emulsions may be used in beverages without weighting agents.

22 Claims, 1 Drawing Sheet

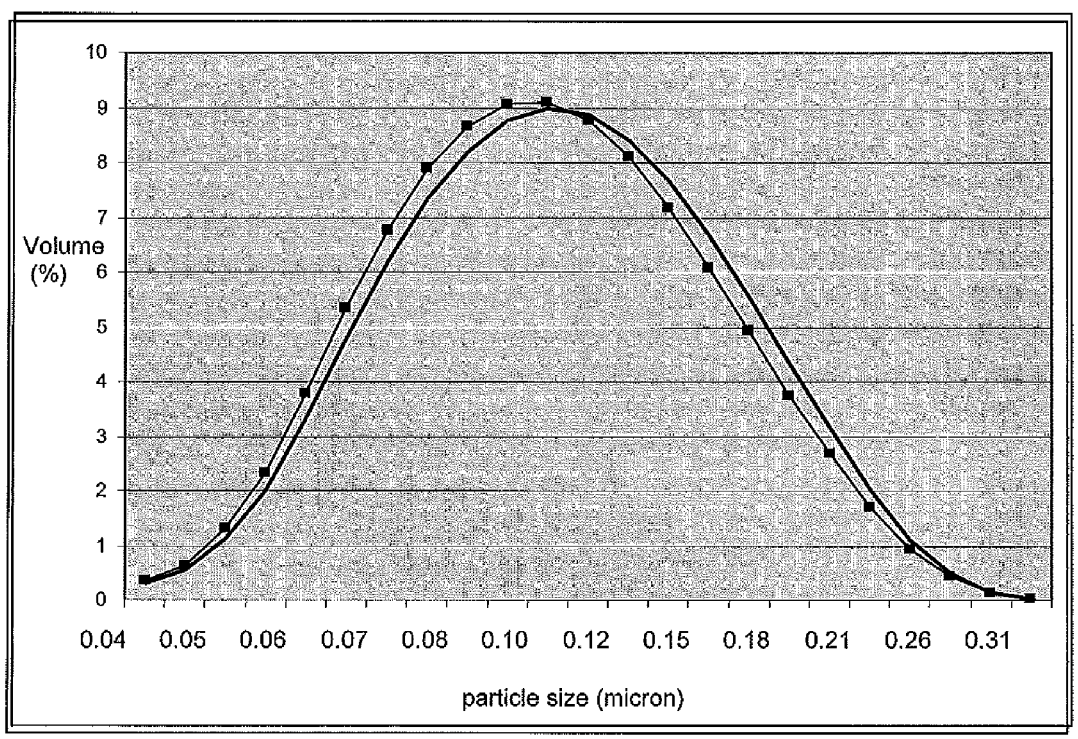
squares (■) - fresh emulsion
smooth line (-) 6-months old emulsion

EMULSIONS USEFUL IN BEVERAGES

FIELD OF INVENTION

This invention relates to emulsions useful in beverages with a discrete phase volume fraction of 60% to 67% comprising at least one low molecular weight surfactant and having a mean particle size less than 0.2 microns, the method of making the emulsions, and compositions containing the emulsions.

BACKGROUND OF THE INVENTION

Quillaja is a surfactant extracted from the inner bark of soap bark trees, Quillaja Saponaria Molina, an evergreen native to Chile and Peru. Containing saponins, it is often used as a substitute for soap and as an agricultural spray adjuvant. Quillaja is also used in pharmaceuticals, food products, personal care products, and fire-fighting foams.

Weighting agents are used in a significant portion of the beverage emulsions on the market today. Weighting agents are undesirable in that they typically constitute about half the cost of the emulsion, have regulatory limits, cannot be used in natural beverages, and add to the complexity and length of processing the beverage. Without using a weighting agent, however, emulsions and their resulted beverages are very difficult to stabilize. Small particle size is one of the most important and difficult factors to achieve for non-weighted emulsions. Small particle size is important for many emulsions, and is particularly beneficial for clear beverages and alcohol containing beverages.

SUMMARY OF THE INVENTION

It has now been found that emulsions having a discrete phase volume fraction of 60% to 67% with excellent stability may be prepared using at least one low molecular weight surfactant, Such emulsions have high oil loading and a small mean particle size of less than 0.2 microns. Further, such emulsions may be produced and used in beverages without weighting agents.

As used herein, "discrete phase" is intended to mean the dispersed or non-continuous phase and is intended to include the oil phase and the LMW surfactant.

As used herein, "non-weighted" is intended to mean containing essentially no weighting agents. Weighting agents are well-known in the art and include without limitation brominated vegetable oil, damar gum, sucrose acetate isobutyrate (SAIB) and other sucrose esters, glycerol ester of wood rosin (ester gum), colophony, polyglycerol fatty acid esters, gum elemi, and glycerol esters of gum rosin.

As used herein, "quillaja solid extract" is intended to mean the solid portion of the quillaja containing the surface-active saponin which provides the emulsification property. The term quillaja solid extract is not intended to mean liquid quillaja extract which contains the solid portion and water.

Low molecular weight surfactants is intended to include surfactants with an HLB greater than 9 and an average molecular weight less than 10,000 Daltons.

As used herein, polysorbate is intended to mean polyoxyethylene (20) sorbitan mono-fatty acid esters or Tweens, a class of emulsifiers commercially available on the market as:
 Tween 20=polyoxyethylene (20) sorbitan monolaurate;
 Tween 40=polyoxyethylene (20) sorbitan monopalmitate;
 Tween 60=polyoxyethylene (20) sorbitan monostearate; and
 Tween 80=polyoxyethylene (20) sorbitan monooleate.

The number (20) following the polyoxyethylene part refers to the total number of oxyethylene —($CH_2CH_2O$)— groups found in the molecule. The number following the Tween part is related to the type of fatty acid associated with the polyoxyethylene sorbitan part of the molecule.

As used herein, oil-in-water emulsion is intended to mean an emulsion in which the oil is in the discrete phase and the water (aqueous) is the continuous phase.

All ratios, percent, and fractions are on a weight/weight basis and all temperatures are in degrees Celsius unless otherwise expressly stated.

All pressures, unless otherwise expressly stated, are as measured on the APV homogenizer specified in the Examples section.

BRIEF DESCRIPTION OF FIGURES

FIG. 1 depicts the particle size distribution of an emulsion containing 48.9% by weight of five-fold (5x) orange oil. The curve with squares (■) is of the fresh emulsion with a mean particle size of 0.142 microns. The curve with the smooth line is of a 6-months old emulsion with a mean particle size of 0.151 microns.

DETAILED DESCRIPTION OF THE INVENTION

The present invention pertains to oil-in-water emulsions having a discrete phase volume fraction of 60% to 67% and prepared using at least one low molecular weight surfactant. Such emulsions have excellent emulsion stability, high load, and a small mean particle size of less than 0.2 microns. Further, such emulsions may be produced and used in beverages without a weighting agent.

The at least one low molecular weight (LMW) surfactant is present in an amount of from 2% to 25%, in one embodiment from 8% to 14%, and in yet another embodiment from 12% to 14% (wt/wt) based on the emulsion. In one embodiment, the low molecular weight surfactant is selected from the group consisting of quillaja solid extract, polysorbate, lecithin, sugar esters, esters of glycerin, and mixtures thereof. In another embodiment, the low molecular weight surfactant is selected from the group consisting of quillaja solid extract, polysorbate, lecithin, and mixtures thereof, in yet another embodiment is a mixture of quillaja solid extract and polysorbate, and in still another embodiment is a mixture of quillaja and polyoxyethylene (20) sorbitan monostearate (Tween 60).

The oil may be any oil used in emulsions, and in one embodiment used in beverage emulsions such as flavor, color, and/or nutrient containing oils, as well as any plant oil, and may be natural or synthetic. In one embodiment, the oil is a fruit oil such as orange oil. In another aspect, the oil contains a nutrient such as Vitamin E. In still another embodiment, the oil contains an omega-III fatty acid. The oil is present in a discrete phase volume fraction of from 60 to 67 and in one embodiment is present in a discrete phase volume fraction of from 62% to 65%. In one embodiment, the volume ratio of LMW surfactant to oil is from 1:2 to 1:5.

The volume fraction of the discrete phase is calculated as set forth in the Examples section.

The emulsion is an oil-in-water emulsion and in one aspect the ratio of the continuous phase to the discrete phase is from 40:60 to 33:67 (v/v) and in another embodiment from 38:62 to 35:65 (v/v). The emulsion has a high solids level (discrete phase), and in one embodiment such high solids emulsion may be stored as is and then diluted to the desired solids level with water or other aqueous solvent immediately before or during incorporation into the end use composition, such as a beverage. In the alternative, the high solids emulsion may be diluted prior to storage to enhance the stability.

In one aspect of the invention, the emulsion contains essentially no weighting agents, in one embodiment less than 1% weighting agent, in another embodiment less than 0.5% weighting agent, in yet another embodiment less than 0.1% weighting agent, and in a further embodiment 0% weighting agent, all on a weight/weight percentage based on the emulsion. In still yet another embodiment, the emulsion contains a weighting agent.

The emulsion contains water or an aqueous solution in the continuous phase. The emulsion may optionally contain additional food grade components. Such food grade components include without limitation sugar alcohols or other sugar substitutes, pH agents, salinity agents, colorants and thickeners. In one aspect, the continuous phase contains a preservative and in another the preservative is sodium benzoate.

The emulsions may be prepared using any method of emulsification known in the art. The emulsions are unique, however, in that the small particle size and excellent stability are achieved by first mixing the ingredients to achieve the desired discrete volume fraction. The mixed ingredients are then homogenized using means known in the art to achieve the desired small mean particle size and/or distribution. Such homogenization is at a pressure of 17 to 65.5 MPa, in one embodiment at a pressure of 31 to 58.6 MPa, and in another embodiment at a pressure of 37.9 to 58.6 MPa, all based on that achieved using the APV pressure homogenizer detailed in the Examples section. Pressures for other homogenizers may be different, and the skilled practitioner would easily be able to adjust from one homogenizer type to another and determine the equivalent pressure range on each. Further, such small mean particle size and/or distribution may be achieved at such pressures using less than 10 passes, in one embodiment less than 8 passes, and in another embodiment less than 6 passes.

In one embodiment in which polysorbate is used, the polysorbate is melted into a mixture of water and optionally quillaja solid extract, pre-homogenized using high shear, and then homogenized, in one embodiment for 2-6 passes at a pressure of from 17 to 48 MPa.

The resultant emulsions have excellent load, in one embodiment at least a 40% load and in another at least a 50% load. Load is intended to mean the percent (w/w) of the oil on the basis of the emulsifier.

The resultant emulsions have a good emulsion particle size distribution. In one aspect of the invention the mean particle size is between 0.1 and 0.2 microns, in another embodiment less than 0.2 microns and in yet another embodiment less than 0.15 microns. In another embodiment, at least 90% of the emulsion particles are no greater than 0.2 microns, and in a further embodiment no greater than 0.15 microns, using the tests set forth in the Examples section. In a still further embodiment, at least 95% of the emulsion particles are no greater than 0.2 microns, and in another embodiment no greater than 0.15 microns, using the tests set forth in the Examples section.

The resultant beverage emulsions also have excellent stability, such that the mean particle size remains between 0.1 and 0.2 microns for at least 3 months, in another embodiment for at least six months and in still another embodiment for at least 12 months at room temperature. Further, in one embodiment, at least 90% of the emulsion particles remain no greater than 0.2 microns, and in another embodiment no greater than 0.15 microns for such time, using the tests set forth in the Examples section. In a further embodiment, at least 95% of the emulsion particles remain no greater than 0.2 microns, and in another embodiment no greater than 0.15 microns for such time, using the tests set forth in the Examples section.

The resultant emulsions are useful in a variety of compositions and in one aspect of the invention may be used in any type of beverage. In one embodiment, the emulsions are useful in alcoholic beverages and in yet another embodiment in clear beverages. Clear beverage is intended to mean any beverage with less than 100 Nephelometric Turbidity Units (NTU). The fine particle size and uniform distribution may reduce sediment, creaming, ringing, and/or Ostwald ripening.

EXAMPLES

The following examples are presented to further illustrate and explain the present invention and should not be taken as limiting in any regard. All ratios, parts and percentages are given by weight and all temperatures in degrees Celsius (° C.) unless otherwise noted.

The following materials were used throughout the examples. Q-NATURALE® 200 emulsifier, a liquid quillaja extract which contains about 21% quillaja solid extract and 14% active saponin, commercially available from National Starch LLC (Bridgewater, N.J.)

Tween 60, a polysorbate commercially available from Croda Inc, (Edison, N.J.)

Orange oil 5× (5 fold) with a density of 0.86 g/ml, commercially available from Givaudan (Cincinnati, Ohio)

Pure vegetable oil with a density of 0.93 g/ml

The following equipment was used through out the examples.

High shear mixer, model HSM-100LC1, from Ross and Co. (Long Island, N.Y.)

Homogenizer, model Gaulin MR15, from APV (Getzville, N.Y.)

Particle size analyzer, Coulter Counter LS320, Beckman Coulter Inc. (Fullerton, Calif.)

The following procedures were used throughout the examples.

Particle Size Test

Emulsion particle sizes is measured using the LS13 320, manufactured by Beckman Coulter that incorporates Polarization Intensity Differential Scattering (PIDS) and static light scatting, which covers a particle size range between 0.04 um to 2000 um.

Using the Beckman Coulter software, version 5.01, the optical parameters for the emulsions as 1.5 for real index of refractions, and 0 for imaginary index of refraction, are entered.

Standard procedure is followed in steps as measuring offsets; Alignment; Background measurement; and sample loading. A diluted sample (diluted to 10% emulsion with water) is then introduced by drops into the sample reservoir while reading in the Measure Loading is observed. When obscuration is in between 40% to 60%, the measurement is started.

When analyzing results, volume fraction is used to generate particle size distribution. Arithmetic particle size distribution, including for particle size larger than 1 micron, is obtained by selecting 2, 0.4, 0.7, 1.0 micron in the statistic window.

Determination of Volume Fraction

The volume fraction of the discrete phase is calculated as the sum of the volume fraction of the oil phase plus the volume fraction of the low molecular weight surfactant. The volume fraction of the oil phase is estimated as weight fraction of the oil phase divided by the density of the oil phase.

The volume faction of the LMW surfactant and the aqueous phase are estimated as the same as the weight fraction.

Example 1

Preparation of an Emulsion of 5-Fold Orange Oil with Resulting Mean Particle Size of 0.15 Microns The volume fraction of the oil and the LMW surfactant, the total discrete phase's volume fraction, and the weight percentage are shown in the table 1.1.

TABLE 1.1

| Ingredients | Weight Percent. | Volume fraction. |
|---|---|---|
| Orange Oil 5X | 48.9% | 56.9% |
| Quillaja solid extract | 7.5% | 7.5% |
| Water phase | 43.6% | 43.6% |
| Total volume fraction of discrete phase | | 60% |

One kilogram of pre-emulsion was made as follows.

The water phase was prepared by adding Quillaja extract containing 7.5% of Quillaja solid extract to 43.6%. A pre-emulsion was made by slowly adding 48.9% of 5 fold Orange oil to the water phase using an LCI high shear mixer (Model HSM-100 LCI from Charles Ross & Son Company) at 7500 rpm for 3 minutes.

The above pre-emulsion was homogenized using an APV pressure homogenizer (Model 15 MR Laboratory Homogenizer from APV Gaulin) for 3 passes at 44.8 MPa. The particle size of the emulsion was then checked. The emulsion's mean particle size was 0.142 microns. After 6 months storage, the room temperature emulsion of the present invention was stable and had a mean particle size of 0.151 microns.

Example 2

Preparation of Emulsions of Vegetable Oil with Resulting Mean Particle Size of Less than 0.2 Microns The volume fraction of each ingredient and the total volume fraction of the discrete phase of all three samples are shown in the table 2.1 and the weight percentages of all three samples are shown in table 2.2.

TABLE 2.1

| | Volume fraction | | |
|---|---|---|---|
| Ingredients | Sample 1 | Sample 2 | Sample 3 |
| Vegetable oil | 53% | 52% | 53% |
| Tween 60 | 12% | 10% | 11% |
| Total discrete phase volume fraction | 65% | 62% | 64% |

TABLE 2.2

| | Weight percentage | | |
|---|---|---|---|
| Ingredients | Sample 1 | Sample 2 | Sample 3 |
| Vegetable oil | 49% | 48% | 49% |
| Tween 60 | 12% | 10% | 11% |
| Water | 39% | 42% | 40% |

One kilogram of pre-emulsion was made as follows.

Tween 60 was heated to 65° C. to be fully liquefied. The water phase was prepared by adding 12%, 10%, or 11% of liquefied Tween 60 to 60° C. water at the amount of 39%, 42%, and 40% for sample 1, 2, and 3 respectively. The pre-emulsion were made by slowly adding the vegetable oil to the water phase using an LCI high shear mixer (Model HSM-100 LCI from Charles Ross & Son Company) at 10000 rpm for 3 minutes. The above pre-emulsion was homogenized using an APV pressure homogenizer (Model 15 MR Laboratory Homogenizer from APV Gaulin) for 3 passes at 58.6 MPa. The particle size of the emulsion was then checked at day 0 and every month after for 12 months. After 12 months storage, the room temperature emulsions of the present invention were stable. The mean particle size results are shown in table 2.3.

TABLE 2.3

| | Mean Particle Size (micron) | |
|---|---|---|
| | Day 0 | 1 year |
| Sample 1 | 0.158 | 0.163 |
| Sample 2 | 0.154 | 0.171 |
| Sample 3 | 0.139 | 0.142 |

Example 3

Comparison of Emulsions of 5 Fold Oil with Discrete Phase Volume Fraction Outside the Claimed Range Both volume fraction of the ingredients and total volume fraction of discrete phase of all 4 samples are shown in table 3.1. The weight percentages of all of the ingredients are shown in table 3.2

TABLE 3.1

| | Volume fraction | | | |
|---|---|---|---|---|
| Ingredients | Sample 1 | Sample 2 | Sample 3 | Sample 4 |
| 5 fold Orange oil | 33% | 38% | 43% | 51% |
| Tween 60 | 4% | 12% | 15% | 17% |
| Quillaja Solid extract | 0.84% | 1.73% | 0.84% | 2% |
| Total discrete phase volume fraction | 37.84% | 51.73% | 58.84% | 70% |

TABLE 3.2

| | Weight percentage | | | |
|---|---|---|---|---|
| Ingredients | Sample 1 | Sample 2 | Sample 3 | Sample 4 |
| 5 fold Orange oil | 28.38% | 32.98% | 36.98% | 43.86% |
| Tween 60 | 4% | 12% | 15% | 17% |
| Quillaja Solid extract | 0.84% | 1.73% | 0.84% | 2% |
| Water | 66.78% | 53.59% | 47.18% | 36.14% |

One kilogram of pre-emulsion was made as follows.

Tween 60 was heated to 65° C. to be fully liquefied. The water phase was prepared by adding the liquefied Tween 60 (4%, 12%, 15%, or 17%) and Quillaja solid extract (0.84%, 1.73%, 0.84%, or 2%) to 60° C. water (66.78%, 53.59%, 47.18% or 37.14%) for samples 1, 2, 3 and 4 respectively. The pre-emulsions were made by slowly adding the needed 5 fold Orange oil (28.38%, 32.68%, 36.98% or 43.86%) to the water phase using an LCI high shear mixer (Model HSM-100 LCI from Charles Ross & Son Company) at 7500 rpm for 3 minutes. Sample 4's pre-emulsion was extremely viscous with a pudding-like thickness: it was not able to be run successfully through the homogenizer. The other pre-emulsions were homogenized using an APV pressure homogenizer (Model 15 MR Laboratory Homogenizer from APV Gaulin) for 3 passes at 44.8 MPa. The particle size of the emulsions was then checked. The mean particle size results are shown in table 3.3.

TABLE 3.3

| Mean particle size (micron) - day 0 | |
| --- | --- |
| Sample 1 | 0.822 |
| Sample 2 | 0..656 |
| Sample 3 | 0.393 |

We claim:

1. An oil-in-water emulsion comprising:
a) a water-containing continuous phase;
b) an oil-containing discrete phase; and
c) at least one low molecular weight surfactant;
wherein the volume fraction of the discrete phase is from 60% to 67%;
the emulsion has a mean particle size of less than 0.2 microns;
the low molecular weight surfactant is selected from the group consisting of quillaja solid extract, polysorbate, and mixtures thereof; and
wherein the low molecular weight (LMW) surfactant is present in an amount of from 2% to 25% (wt/wt).

2. The emulsion of claim 1, wherein the volume fraction of the discrete phase is from 62% to 65%.

3. The emulsion of claim 1, wherein the low molecular weight surfactant is selected from the group consisting of quillaja solid extract, polysorbate.

4. The emulsion of claim 1, wherein the low molecular weight surfactant is quillaja solid extract and polysorbate.

5. The emulsion of claim 4, wherein the polysorbate is polyoxyethylene (20) sorbitan monostearate (Tween 60).

6. The emulsion of claim 1, wherein the mean particle size of the emulsion is less than 0.15 microns.

7. The emulsion of claim 1, wherein at least 90% of the emulsion particles are no greater than 0.2 microns.

8. The emulsion of claim 7, wherein at least 90% of the emulsion particles are no greater than 0.15 microns.

9. The emulsion of claim 1, wherein the emulsion is stable such that the mean particle size remains less than 0.2 microns for at least 3 months.

10. The emulsion of claim 9, wherein the emulsion is stable such that the mean particle size remains less than 0.2 microns for at least 6 months.

11. The emulsion of claim 9, wherein the emulsion is stable such that the mean particle size remains less than 0.2 microns for at least 12 months.

12. The emulsion of claim 1, in which the emulsion is a non-weighted emulsion.

13. A method of making the oil-in-water emulsion of claim 1 comprising:
a) mixing water, oil and at least one low molecular weight surfactant to obtain a volume fraction of the discrete phase from 60% to 67%; and
b) homogenizing with less than 10 passes at a pressure of 17 to 65.5 MPascals;
to result in an oil-in-water emulsion with a mean particle size of less than 0.2 microns:
the low molecular weight surfactant is selected from the group consisting of quillaja solid extract, polysorbate, and mixtures thereof: and
wherein the low molecular weight (LMW) surfactant is present in an amount of from 2% to 25% (wt/wt).

14. The method of claim 13, wherein the volume fraction of the discrete phase is from 62% to 65%.

15. The method of claim 13, wherein the low molecular weight surfactant is selected from the group consisting of quillaja solid extract and polysorbate.

16. The method of claim 13, wherein the low molecular weight surfactant is quillaja solid extract and polysorbate.

17. The method of claim 16, wherein the polysorbate is polyoxyethylene (20) sorbitan monostearate (Tween 60).

18. The method of claim 13, wherein the mean particle size of the emulsion is between 0.1 and 0.2 microns.

19. The method of claim 13, wherein at least 90% of the emulsion particles are no greater than 0.2 microns.

20. The method of claim 19, wherein at least 90% of the emulsion particles are no greater than 0.15 microns.

21. An oil-in-water emulsion comprising:
a) a water-containing continuous phase;
b) an oil-containing discrete phase; and
c) at least one low molecular weight surfactant;
wherein the volume fraction of the discrete phase is from 60% to 67%;
the emulsion has a mean particle size of less than 0.2 microns;
the low molecular weight surfactant is selected from the group consisting of quillaja solid extract, polysorbate, sugar esters, and mixtures thereof; and
wherein at least one low molecular weight (LMW) surfactant is present in an amount of from 8% to 14% (wt/wt).

22. An oil-in-water emulsion comprising:
a) a water-containing continuous phase;
b) an oil-containing discretephase; and
c) at least one low molecular weight surfactant;
wherein the volume fraction of the discrete phase is from 60% to 67%;
the emulsion has a mean particle size of less than 0.2 microns;
the low molecular weight surfactant is selected from the group consisting of quillaja solid extract, polysorbate, sugar esters, and mixtures thereof; and
wherein at least one low molecular weight (LMW) surfactant is present in an amount of from 12% to 14% (wt/wt).

* * * * *